JOHN JOHNSON.
Globe Valves.
No. 124,211.
Patented March 5, 1872.
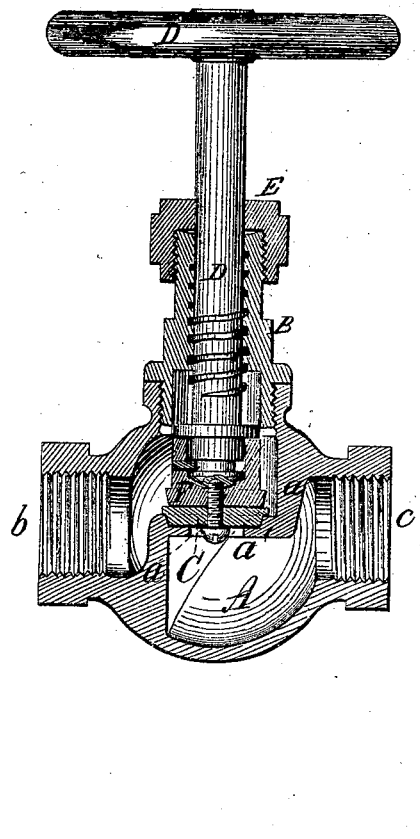
Witnesses.
A. Ruppert,
C. F. Clausen
Inventor.
John Johnson
D. P. Holloway & Co
Atty

124,211

UNITED STATES PATENT OFFICE.

JOHN JOHNSON, OF BROOKLYN, NEW YORK, ASSIGNOR TO HIMSELF AND WILLIAM A. SPEAIGHT, OF SAME PLACE.

IMPROVEMENT IN GLOBE-VALVES.

Specification forming part of Letters Patent No. 124,211, dated March 5, 1872.

Specification describing a certain Improvement in Globe-Valves, invented by JOHN JOHNSON, of Brooklyn, Kings county, and State of New York.

The nature of this invention consists in making the valve-face of a detachable soft-metal disk, which is secured to a swiveling head on the end of the valve-stem, and is used in combination with a seat having a recess, into which the soft-metal disk snugly fits for the purpose of preventing the spreading of the latter in screwing it down upon the seat.

I am aware that, broadly, the use of soft metal as a surface of contact between the valve and its seat is not new, as such surfaces have long been formed by casting the soft metal in an annular recess in either the valve or its seat. When the soft-metal ring thus formed becomes worn and a new one has to be substituted, the metal must be melted out of its recess, and, after the latter is again filled, the new surface must be dressed in a lathe, all of which requires the removal of the valve from its connections, and is otherwise attended with a good deal of labor and expense. Detachable soft-metal valve-faces have also been used, but always in connection with raised seats, which, by spreading the soft metal in screwing the valve down upon such seat, soon wore it out. These objections are overcome by my invention of an easily-detachable soft-metal disk, which can be dressed separately and readily applied to the swiveling head of the valve-stem, and the spreading of which is prevented by entering a recess in the seat in closing the valve.

The figure represents my improved valve in vertical section.

The hollow globe A is divided by the diaphragm $a$, which, at $a'$, forms the perforated seat of the valve. Upon each side of the diaphragm the globe has a short nozzle, $b$ and $c$, respectively, for making connections with the induction and eduction pipes in the usual manner. Vertically above the seat it has a third screw-threaded nozzle for the reception of the nut B, in which the screw-threaded valve-stem D works, passing through the stuffing-box E, and terminating in a hand-wheel, $D'$. The valve proper consists of the soft-metal disk C, screwed to the lower end of the head F, or secured in any other preferred manner, provided, however, that it can be readily detached from the head. The latter is fitted upon the end of the valve-stem and secured thereto by a pin, which projects into an annular groove around the stem, in the manner shown, allowing the stem to readily turn in the head in screwing the valve down on its seat, so as to prevent any unnecessary wear of the soft-metal disk by friction against the seat. The valve-seat is constructed with a recess, into which the soft-metal disk C snugly fits. The raised shoulder around the recess will not permit any spreading of the soft metal, and thus aid in preserving the valve-face intact.

What I claim as my invention, and desire to secure by Letters Patent, is—

The detachable soft-metal valve-disk, resting vertically upon the interior annular horizontal flanged seat and within the inclined walls of the same, an extension of said valve resting upon the upper outer walls of the valve-seat, when the same is combined with the swiveled follower, substantially as shown and described.

In testimony whereof I have signed my name to this specification in the presence of two subscribing witnesses.

JOHN JOHNSON.

Witnesses:
WM. A. SPEAIGHT,
C. H. RICHARDSON.